United States Patent
Kim

(10) Patent No.: US 12,319,252 B2
(45) Date of Patent: Jun. 3, 2025

(54) ELECTRONIC BRAKE SYSTEM AND METHOD FOR CONTROLLING SAME

(71) Applicant: HL MANDO CORPORATION, Pyeongtaek-si (KR)

(72) Inventor: Seokjong Kim, Hwaseong-si (KR)

(73) Assignee: HL MANDO CORPORATION, Pyeongtaek-si (KR)

(*) Notice: Subject to any disclaimer, the term of this patent is extended or adjusted under 35 U.S.C. 154(b) by 356 days.

(21) Appl. No.: 17/771,106

(22) PCT Filed: Oct. 22, 2020

(86) PCT No.: PCT/KR2020/095126
§ 371 (c)(1),
(2) Date: Apr. 22, 2022

(87) PCT Pub. No.: WO2021/080401
PCT Pub. Date: Apr. 29, 2021

(65) Prior Publication Data
US 2022/0371567 A1    Nov. 24, 2022

(30) Foreign Application Priority Data
Oct. 23, 2019 (KR) .......... 10-2019-0132092

(51) Int. Cl.
*B60T 13/74* (2006.01)
*B60T 8/17* (2006.01)
(Continued)

(52) U.S. Cl.
CPC .............. *B60T 13/745* (2013.01); *B60T 8/17* (2013.01); *B60T 13/662* (2013.01);
(Continued)

(58) Field of Classification Search
CPC .... B60T 13/662; B60T 13/686; B60T 13/745; B60T 8/17; B60T 8/171; B60T 17/22; B60Y 2400/81
See application file for complete search history.

(56) References Cited

U.S. PATENT DOCUMENTS 8,727,453 B2 * 5/2014 Saita .................. B60T 13/686
303/122.04
2006/0238024 A1  10/2006 Akita
(Continued)

FOREIGN PATENT DOCUMENTS

CN       102189984 A    9/2011
JP       2000-177570 A  6/2000
(Continued)

OTHER PUBLICATIONS

Office Action dated on Oct. 11, 2023, in connection with Chinese Patent Application No. 202080073074.1, with English machine translation (8 pages).
(Continued)

*Primary Examiner* — Thomas J Williams
(74) *Attorney, Agent, or Firm* — Hauptman Ham, LLP

(57) ABSTRACT

An electronic brake system including a hydraulic circuit that supplies a hydraulic pressure to a wheel cylinder, the electronic brake system including: a plurality of electronic valves provided to open and close a flow path of the hydraulic circuit; and a controller configured to correct a target current of an electronic valve in operation among the plurality of electronic valves based on a voltage input from a battery of a vehicle during braking control or feedback currents of the plurality of electronic valves, and increase a current supplied to the electronic valve so that the current of the electronic valve in operation reaches the corrected target current.

10 Claims, 6 Drawing Sheets

(51) Int. Cl.
*B60T 13/66* (2006.01)
*B60T 13/68* (2006.01)
*B60T 17/22* (2006.01)

(52) U.S. Cl.
CPC ............ *B60T 13/686* (2013.01); *B60T 17/22* (2013.01); *B60Y 2400/81* (2013.01)

(56) References Cited

U.S. PATENT DOCUMENTS

| | | | |
|---|---|---|---|
| 2015/0239439 A1* | 8/2015 | Sussek | B60T 13/588 |
| | | | 701/70 |
| 2015/0303805 A1* | 10/2015 | Franchini | G01R 31/327 |
| | | | 324/503 |
| 2016/0221558 A1* | 8/2016 | Nishida | B60T 13/662 |
| 2019/0256066 A1* | 8/2019 | Kanda | B60T 8/17 |
| 2022/0371567 A1* | 11/2022 | Kim | B60T 7/042 |

FOREIGN PATENT DOCUMENTS

| | | |
|---|---|---|
| JP | 2010-95026 A | 4/2010 |
| JP | 2011-184012 A | 9/2011 |
| JP | 2014-83977 A | 5/2014 |
| JP | 2014-083977 A | 5/2014 |
| KR | 10-2017-0087708 A | 7/2017 |

OTHER PUBLICATIONS

International Search Report issued Feb. 3, 2021, corresponding to International Application No. PCT/KR2020/095126 citing the above reference(s).

* cited by examiner

ELECTRONIC BRAKE SYSTEM AND METHOD FOR CONTROLLING SAME

CROSS-REFERENCE TO RELATED APPLICATION

The present application is a national stage filing under 35 U.S.C. § 371 of PCT application number PCT/KR2020/095126 filed on Oct. 22, 2020, which is based upon and claims the benefit of priorities to Korean Patent Application No. 10-2019-0132092 filed on Oct. 23, 2019, in the Korean Intellectual Property Office. All of the aforementioned applications are hereby incorporated by reference in their entireties.

TECHNICAL FIELD

The disclosure relates to an electronic brake system and a control method thereof, and more specifically, to an electronic brake system and a control method thereof that generates a braking force according to an electrical signal corresponding to a displacement of a brake pedal.

BACKGROUND ART

In general, when a brake pedal is depressed by a driver, an electronic brake system receives an electrical signal corresponding to a driver's braking intention from a pedal displacement sensor that detects a displacement of the brake pedal, and supplies hydraulic pressure, required for braking, to wheel cylinders by actuating a hydraulic pressure supply device based on thereon.

An electronic brake system generates hydraulic pressure, required for braking, by changing a position of a hydraulic piston with a rotation force of a motor, and introduces the generated hydraulic pressure into wheel cylinders to brake the vehicle wheels. For example, an electronic brake system is divided into a simulator portion that forms pedal effort according to a driver's braking intention and a circuit portion that transfers the hydraulic pressure generated by the motor to the wheel cylinders, and may include electronic valves that have respective functions.

Due to characteristics of electronic brake system, an operation of electronic valve is limited depending on a voltage applied to the system from a battery provided in a vehicle.

When a voltage of battery provided in a vehicle instantaneously drops while an electronic brake system is operating, electronic valves in operation may not be maintained in an on state and be turned off, and a desired flow path is unable to be maintained. Accordingly, an operation stability of electronic valves may not be secured and pressurization, maintenance, or decompression performances thereof may be deteriorated.

DISCLOSURE

Technical Problem

An aspect of the disclosure provides an electronic brake system and a control method thereof that may ensure a stable braking performance by securing an operation stability of electronic valves, even when a system voltage is changed.

Technical Solution

According to an aspect of the disclosure, there is provided an electronic brake system including a hydraulic circuit that supplies a hydraulic pressure to a wheel cylinder, the electronic brake system including: a plurality of electronic valves provided to open and close a flow path of the hydraulic circuit; and a controller configured to correct a target current of an electronic valve in operation among the plurality of electronic valves based on a voltage input from a battery of a vehicle during braking control or feedback currents of the plurality of electronic valves, and increase a current supplied to the electronic valve so that the current of the electronic valve in operation reaches the corrected target current.

The controller is configured to correct the target current of the electronic valve in operation, when an instantaneous voltage drop occurs in the battery or an instantaneous feedback current drop occurs in the electronic valve in operation.

The controller is configured to increase the target current of the electronic valve in operation to a max current that ensures a cut-in within a pressure range guaranteed by the electronic valve in operation.

The controller is configured to increase the current of the electronic valve in operation to the max current, and when the max current is reached, maintain for a preset period of time, and then decrease the current of the electronic valve in operation to a hold current for maintaining an on state of the electronic valve in operation.

When the voltage input from the battery is lower than a preset voltage or a feedback current of the electronic valve in operation is lower than a preset current, the controller is configured to increase the target current of the electronic valve in operation among the plurality of electronic valves.

The electronic brake system includes a voltage sensor configured to detect the voltage input from the battery.

The electronic brake system includes a current sensor configured to detect the feedback currents of the plurality of electronic valves.

According to another aspect of the disclosure, there is provided a control method of an electronic brake system including a hydraulic circuit that supplies a hydraulic pressure to a wheel cylinder, the control method including: detecting a voltage input from a battery of a vehicle during braking control or feedback currents of a plurality of electronic valves provided to open and close a flow path of the hydraulic circuit; correcting a target current of an electronic valve in operation among the plurality of electronic valves based on the detected voltage or the feedback currents; and increasing a current of the electronic valve in operation, so that the current of the electronic valve in operation reaches the corrected target current.

The correcting of the target current increases the target current of the electronic valve in operation among the plurality of electronic valves, when the voltage input from the battery is lower than a preset voltage or a feedback current of the electronic valve in operation is lower than a preset current.

The increasing of the current of the electronic valve in operation increases the target current of the electronic valve in operation to a max current that ensures a cut-in within a pressure range guaranteed by the electronic valve in operation.

When the current of the electronic valve in operation reaches the max current, the current of the electronic valve in operation is maintained for a preset period of time, and then is decreased to a hold current for maintaining an on state of the electronic valve in operation.

Advantageous Effects

According to an aspect of the disclosure, an electronic brake system and a control method thereof can ensure a stable braking performance by maintaining a desired flow path formation and securing an operation stability of electronic valves in operation, even when a voltage of a battery of a vehicle instantaneously drops.

BEST MODE OF THE DISCLOSURE

Figure 1:
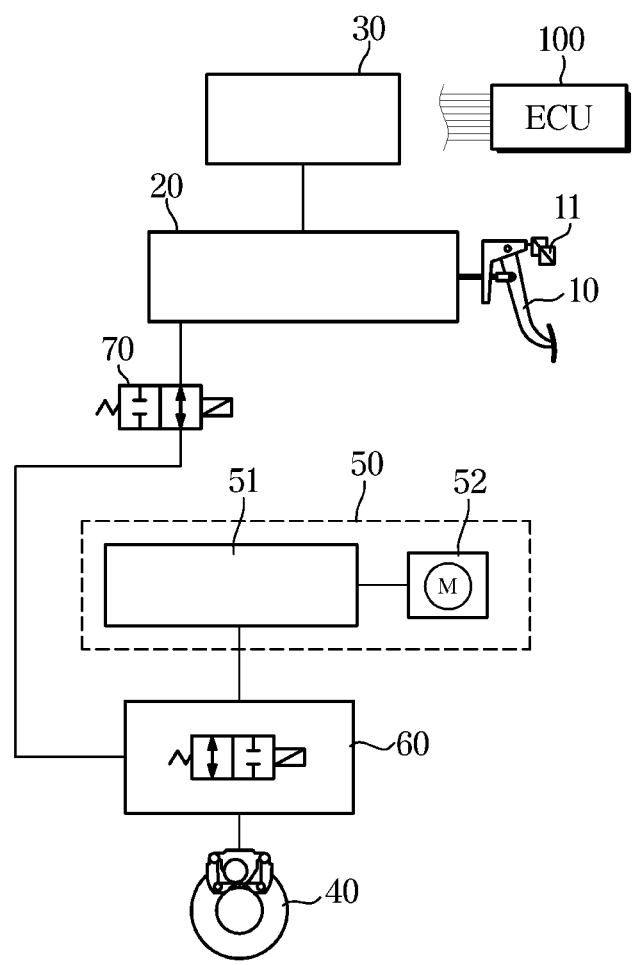
FIG. 1 is a hydraulic circuit diagram of an electronic brake system according to an embodiment of the disclosure.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated elements, but do not preclude the presence or addition of one or more other elements.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 is a hydraulic circuit diagram of an electronic brake system according to an embodiment of the disclosure.

Referring to FIG. 1, the electronic brake system may include a master cylinder 20 to pressurize and discharge pressurized medium accommodated therein by an operation of a brake pedal 10, a reservoir 30 coupled to a upper portion of the master cylinder 20 to store the pressurized medium, a wheel cylinder 40 provided in a vehicle wheel, a hydraulic pressure supply device 50 driven by an electrical signal corresponding to a displacement of the brake pedal 10 to generate hydraulic pressure and supply the generated hydraulic pressure to the wheel cylinder 40 provided in the vehicle wheel, a hydraulic control device 60 to control a flow of hydraulic pressure transmitted to the wheel cylinder 40 by the hydraulic pressure supply device 50, and an electronic control unit (ECU) 100 to control the hydraulic pressure supply device 50, the hydraulic control device 60, and various types of valves based on hydraulic information and pedal displacement information.

The hydraulic pressure supply device 50 may be provided to generate the hydraulic pressure of pressurized medium by receiving a driver's braking intention as an electrical signal from a pedal displacement sensor 11 that detects a displacement of the brake pedal 10 through a mechanical operation.

The hydraulic pressure supply device 50 may be provided in a variety of manners and configurations. For example, a hydraulic piston in a cylinder block 51 moved by a driving force of a motor M pushes out pressurized medium in a pressure chamber of the cylinder block 51, thereby may transmit the hydraulic pressure to the hydraulic control device 60. Also, the hydraulic pressure supply device 50 may be provided as a high pressure accumulator or a pump driven by the motor. Specifically, when a driver depresses the brake pedal 10, a displacement of the brake pedal 10 changes, and thus an electrical signal is transmitted from the pedal displacement sensor 11 and the motor may be driven by the electrical signal. Also, a power conversion part 52 may be provided between the motor and the hydraulic piston to convert a rotational motion of the motor into a linear motion. The power conversion part 52 may include a worm, a worm gear and/or a rack and pinion gear, etc.

The hydraulic control device 60 may include a plurality of flow paths and valves for transferring the hydraulic pressure generated by the hydraulic pressure supply device 50 to the wheel cylinder 40 provided in the vehicle wheel. Meanwhile, the hydraulic control device 60 may be connected to the hydraulic pressure supply device 50 through a hydraulic flow path, and connected to the master cylinder 20 through a backup flow path.

For example, the hydraulic control device 60 may include inlet valves for controlling a flow and hydraulic pressure of the pressurized medium transferred from the hydraulic pressure supply device 50 to the wheel cylinder 40, and outlet valves for controlling a flow of the pressurized medium discharged from the wheel cylinder 40.

The inlet valve may be a normally open type solenoid valve that operates to be closed, when an on-drive signal is received from the ECU 100 in a normally open state.

The outlet valve may be a normally closed type solenoid valve that operates to be open, when an on-drive signal is received from the ECU 100 in a normally closed state.

Also, the electronic brake system may include a cut valve 70 provided in the backup flow path connecting the master cylinder 20 and the hydraulic control device 60.

For instance, the cut valve 70 may be a normally open type solenoid valve that operates to be closed, when an on-drive signal is received from the ECU 100 in a normally open state.

When the cut valve 70 is closed, the hydraulic pressure provided from the hydraulic pressure supply device 50 may be supplied to the wheel cylinder 40. When the cut valve 70 is open, hydraulic pressure provided from the master cylinder 20 may be supplied to the wheel cylinder 40.

Also, the electronic brake system may include the ECU 100 that performs overall control of the electronic brake system.

The ECU 100 may control the hydraulic pressure supply device 50, the hydraulic control device 60 and the cut valve 70.

Hereinafter, braking control of the electronic brake system including the above-described constituent components are described.

When the driver operates the brake pedal 10, the ECU 100 may allow the cut valve 70 to be off in order to close a flow path between the master cylinder 20 and the hydraulic control device 60. The hydraulic pressure discharged from the master cylinder 20 may not be transmitted to the wheel cylinder 40.

Also, the ECU 100 may operate the hydraulic pressure supply device 50. The ECU 100 may operate the motor M of the hydraulic pressure supply device 50. By moving the hydraulic piston in the cylinder block 51 by the operation of the motor M, hydraulic pressure may be generated in the pressure chamber of the cylinder block 51. The hydraulic pressure discharged from the pressure chamber may be transmitted to the hydraulic control device 60. The hydraulic pressure transmitted to the hydraulic control device 60 is transmitted to the wheel cylinder 40 through the inlet valves, thereby generating a braking force on the vehicle wheels.

When various braking operations capable of generating different braking forces for each wheel are required during braking control described above, such as an anti-lock braking system (ABS) operation, a traction control system (TCS) operation, or an electronic stability control (ESC) operation, etc., the ECU 100 may allow the inlet valve and the outlet valve to be on or off for closing or opening, or independently adjust an opening of the inlet valve and the outlet valve using pulse-width modulation (PWM) control, thereby increasing, maintaining or decreasing the hydraulic pressure of the wheel cylinder 40.

As such, when performing braking control of the electronic brake system, various electronic valves are on or off, thereby may secure a braking force.

As described above, in the electronic brake system, an operation of the electronic valves may be limited depending on a voltage applied from a battery provided in the vehicle. That is, when a voltage of the battery instantaneously drops during the operation of the electronic brake system, a current supplied to an electronic valve in operation is lowered, and thus the electronic valve in operation may not be maintained in an on state and may be off. Accordingly, an operation stability of electronic valve may not be secured and a pressurization or decompression performance may be deteriorated.

According to an embodiment, when an instantaneous voltage drop occurs during braking control, the electronic brake system may increase a current supplied to an electronic valve in operation, and thus even when a system voltage changes, an operation stability of electronic valve in operation may be secured and a braking performance may be stably secured.

Figure 2:
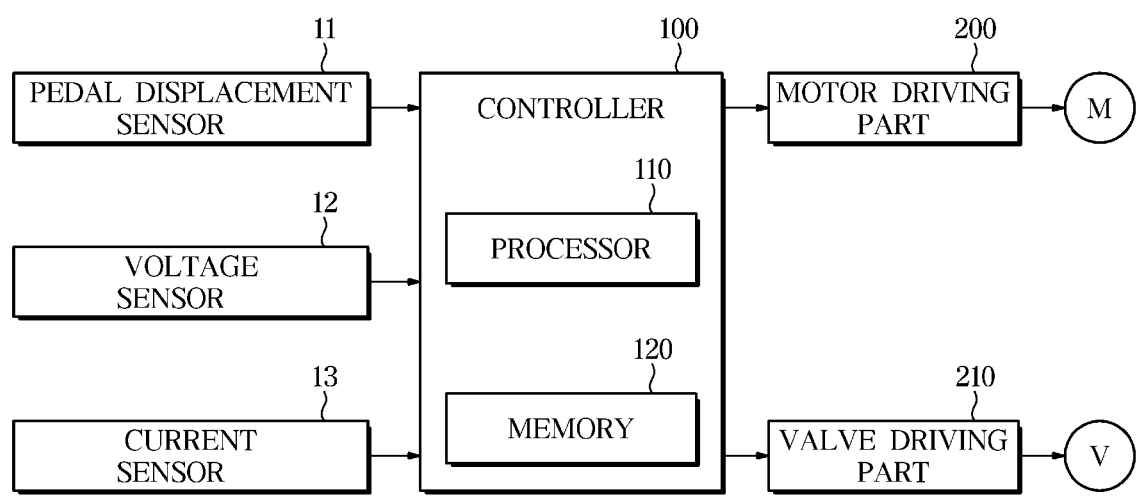
FIG. 2 is a control block diagram of an electronic brake system according to an embodiment of the disclosure.

FIG. 2 is a control block diagram of an electronic brake system according to an embodiment of the disclosure.

Referring to FIG. 2, the electronic brake system may include the ECU 100 that performs overall control.

The ECU 100 is electrically connected to the pedal displacement sensor 11, a voltage sensor 12, a current sensor 13, a motor driving part 200 and a valve driving part 210.

The pedal displacement sensor 11 may detect an operation and a displacement of the brake pedal 10.

The voltage sensor 12 may detect a voltage of a battery provided in a vehicle. The voltage sensor 12 may also detect a voltage input from the battery provided in the vehicle to the electronic brake system. The voltage sensor 12 may detect a voltage input from the battery provided in the vehicle to the motor M of the electronic brake system.

The current sensor 13 may detect currents of various electronic valves V of the electronic brake system. The current sensor 13 may also detect a feedback current fed back from each of the electronic valves V.

The motor driving part 200 may drive the motor M of the hydraulic pressure supply device 50 according to a motor driving signal of the ECU 100.

The valve driving part 210 may drive the various electronic valves V of the electronic brake system according to a valve driving signal of the ECU 100. The ECU 100 may output an on/off driving signal for turning on or off the various electronic valves V, to the valve driving part 210. The ECU 100 may output a duty control signal for adjusting an opening of the various electronic valves V, to the valve driving part 210.

As described above, the various electronic valves V of the electronic brake system may include a solenoid-type electronic valve.

For example, in general, a solenoid-type electronic valve may include a sleeve coupled to an outside of an amateur, the amateur installed inside the sleeve to move forward and backward, a plunger that moves up and down by the forward and backward movement of the amateur to open and close an orifice, an elastic member that presses the plunger toward the amateur, a valve core having a through hole including the plunger and the elastic member and having an internal space in a longitudinal direction, a valve seat provided in the internal space and having an orifice, and an excitation coil installed outside of the sleeve to move the amateur forward and backward.

For an electronic valve which is a normally open type solenoid valve, when a current is supplied to the magnetic coil, a magnetic force between the amateur and the valve core allows the amateur to move toward the valve core and allows the plunger to move toward the valve seat, thereby closing the orifice. When a current is not supplied to the magnetic coil, a magnetic force is released, and thus the plunger is spaced apart from the valve seat by elasticity of the elastic member, thereby opening the orifice. As such, the electronic valve which is the normally open type solenoid type may control supply of hydraulic pressure flowing in a flow path by repeatedly opening and closing the orifice by the forward and backward movement of the plunger.

The ECU 100 may include a processor 110 and a memory 120.

The processor 110 may drive the various electronic valves V of the electronic brake system through the valve driving part 20 according to a braking mode and information detected by the pedal displacement sensor 11 and the voltage sensor 12 (or the current sensor 13).

The processor 110 may correct a target current of an electronic valve in operation among the various electronic valves V of the electronic brake system according to a voltage of the battery provided in the vehicle, and control the electronic valve so that a current of the electronic valve in operation reaches the corrected target current.

When a voltage of the battery provided in the vehicle instantaneously drops during braking control, the processor 110 may increase a current supplied to the electronic valve in operation to a max current that ensures a cut-in within a pressure range guaranteed by the electronic valve in operation. Accordingly, even when the instantaneous voltage drop occurs in the battery of the vehicle, an operation stability of electronic valve may be secured, and thus a braking performance may be secured by maintaining a desired flow path formation.

The memory 120 may store a cut-in current value, a cut-out current value, a max current value, a hold current value, a maintain current value, etc., of various electronic valves V of the electronic brake system in advance.

The memory 120 may include a volatile memory such as a static random access memory (S-RAM) and dynamic random access memory (D-RAM), and a non-volatile memory such as a flash memory, a read only memory (ROM), an erasable programmable read only memory (EPROM), and the like.

Figure 3:
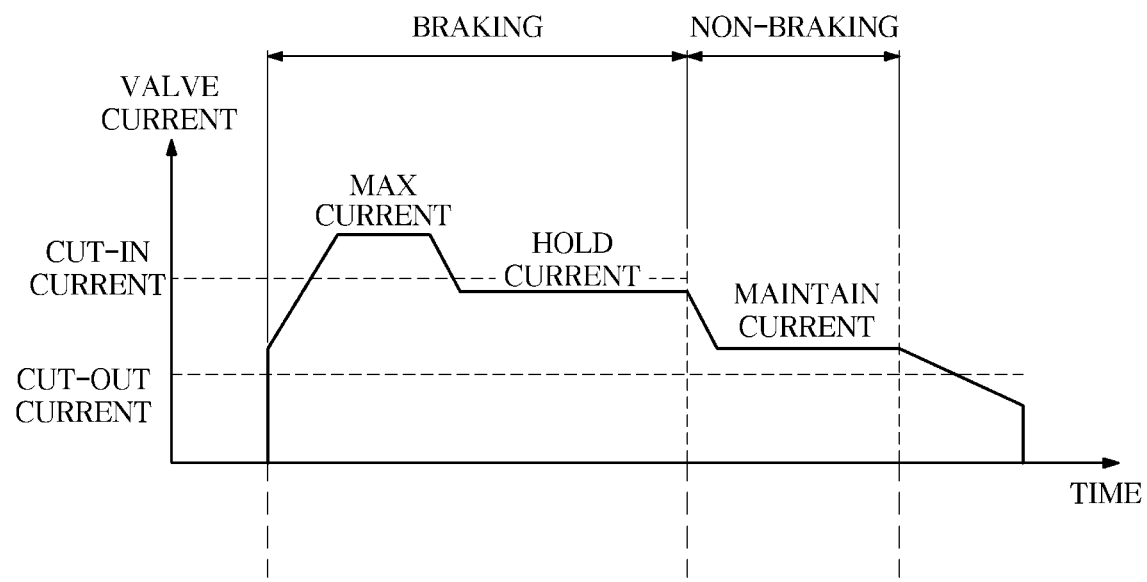
FIG. 3 illustrates a target current pattern of an electronic valve in an electronic brake system according to an embodiment.

FIG. 3 illustrates a target current pattern of an electronic valve in an electronic brake system according to an embodiment.

Referring to FIG. 3, for electronic valves of the electronic brake system, a cut-in current value, a cut-out current value, a max current value, a hold current value, and a maintain current value are preset for each valve type.

A cut-in current is a current for practically operating the electronic valve and may be a critical current to allow the electronic valve in an off state to be on.

A cut-out current is a current for practically releasing an operation of the electronic valve and may be a critical current to allow the electronic valve in an on state to be off.

A max current is a maximum current to secure a cut-in of the electronic valve, and may be a maximum current that ensures a cut-in within a pressure range guaranteed by the electronic valve, when the electronic valve is turned on during braking control. The max current may have a current value higher than the cut-in current by a preset current value.

A hold current may be a sustained current to maintain an on state of an electronic valve in operation during braking control. The hold current may have a current value higher than the cut-out current value and lower than the max current.

A maintain current may be a minimum sustained current to suspend an operation of the electronic valve during non-braking. The maintain current may have a current value lower than the cut-in value and higher than the cut-out current during non-braking.

When a current supplied to a magnetic coil is greater than or equal to the cut-in current, the electronic valve may be turned on, and when the current is decreased to the cut-out current, the electronic valve may be turned off. The electronic valve in the on state may be maintained in the on state, when the current supplied to the magnetic coil maintains the hold current.

In order to turn on the electronic valve during braking control where hydraulic pressure is applied to both ends of the electronic valve in the electronic brake system, a current is first supplied to the magnetic coil of the electronic valve and the supplied current value may be increased until a max current value is reached. When the max current value is reached, the max current value may be maintained for a preset period of time, and then be decreased to the hold current value. Accordingly, the electronic valve may be maintained in the on state after being switched from the off state to the on state.

Figure 4:
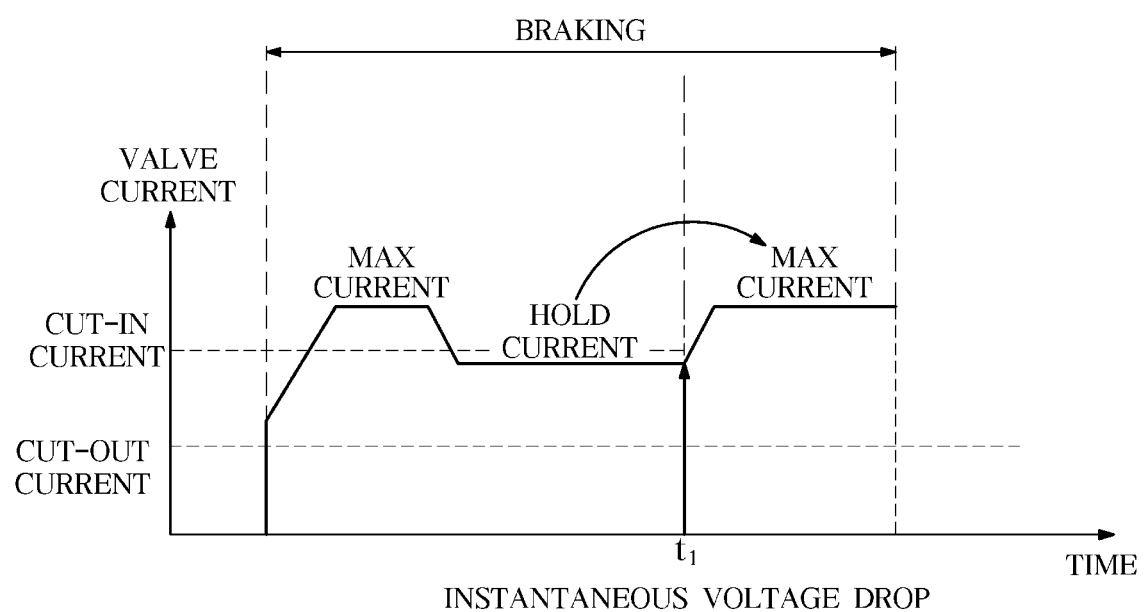
FIG. 4 illustrates changing a target current of an electronic valve when an instantaneous voltage drop occurs during braking control of an electronic brake system according to an embodiment.

FIG. 4 illustrates changing a target current of an electronic valve when an instantaneous voltage drop occurs during braking control of an electronic brake system according to an embodiment.

Referring to FIG. 4, while an electronic valve in operation maintains a hold current during braking control of the electronic brake system, when an instantaneous voltage drop occurs in a battery, or an instantaneous feedback current drop occurs in the electronic valve in operation, the electronic valve in operation may not maintain the hold current and a current thereof may fall below a cut-out current. Accordingly, the electronic valve may fail to maintain an on state.

While the electronic valve in operation maintains the hold current during braking control, when the instantaneous voltage drop occurs in the battery or the instantaneous feedback current drop occurs in the electronic valve in operation, a target current value of the electronic valve in operation is corrected to a max current value which is higher than the hold current value, and a current of the electronic valve in operation may be controlled so that a current value of the electronic valve in operation reaches the max current value. That is, when the instantaneous voltage drop occurs at a point in time t1, the current of electronic valve may be increased to the max current value from the hold current value.

Accordingly, when the instantaneous voltage drop occurs or the instantaneous feedback current drop occurs during braking control of the electronic brake system, the electronic valve in operation may be prevented from failing to maintain the hold current and being off. Therefore, a desired flow path formation may be maintained, thereby may prevent a pressurization or decompression performance from being deteriorated and secure an operation stability of valve.

Figure 5:
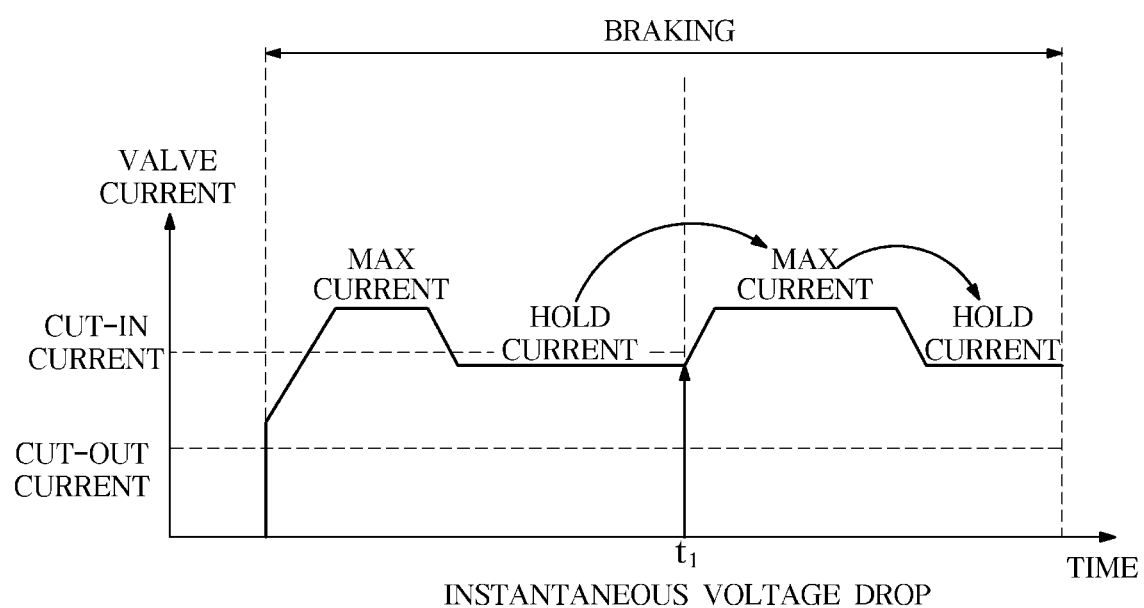
FIG. 5 illustrates changing a target current of an electronic valve from a hold current to a max current, and then changing to the hold current again, when an instantaneous voltage drop occurs during braking control of an electronic brake system according to an embodiment.

FIG. 5 illustrates changing a target current of an electronic valve from a hold current to a max current, and then changing to the hold current again, when an instantaneous voltage drop occurs during braking control of an electronic brake system according to an embodiment.

Referring to FIG. 5, when a current value of an electronic valve in operation reaches a max current value, the processor 110 may maintain a state where the current value of the electronic valve in operation reaches the max current value for a preset period of time, and then decrease the current value of the electronic valve in operation from the max current value to a hold current value again.

Figure 6:
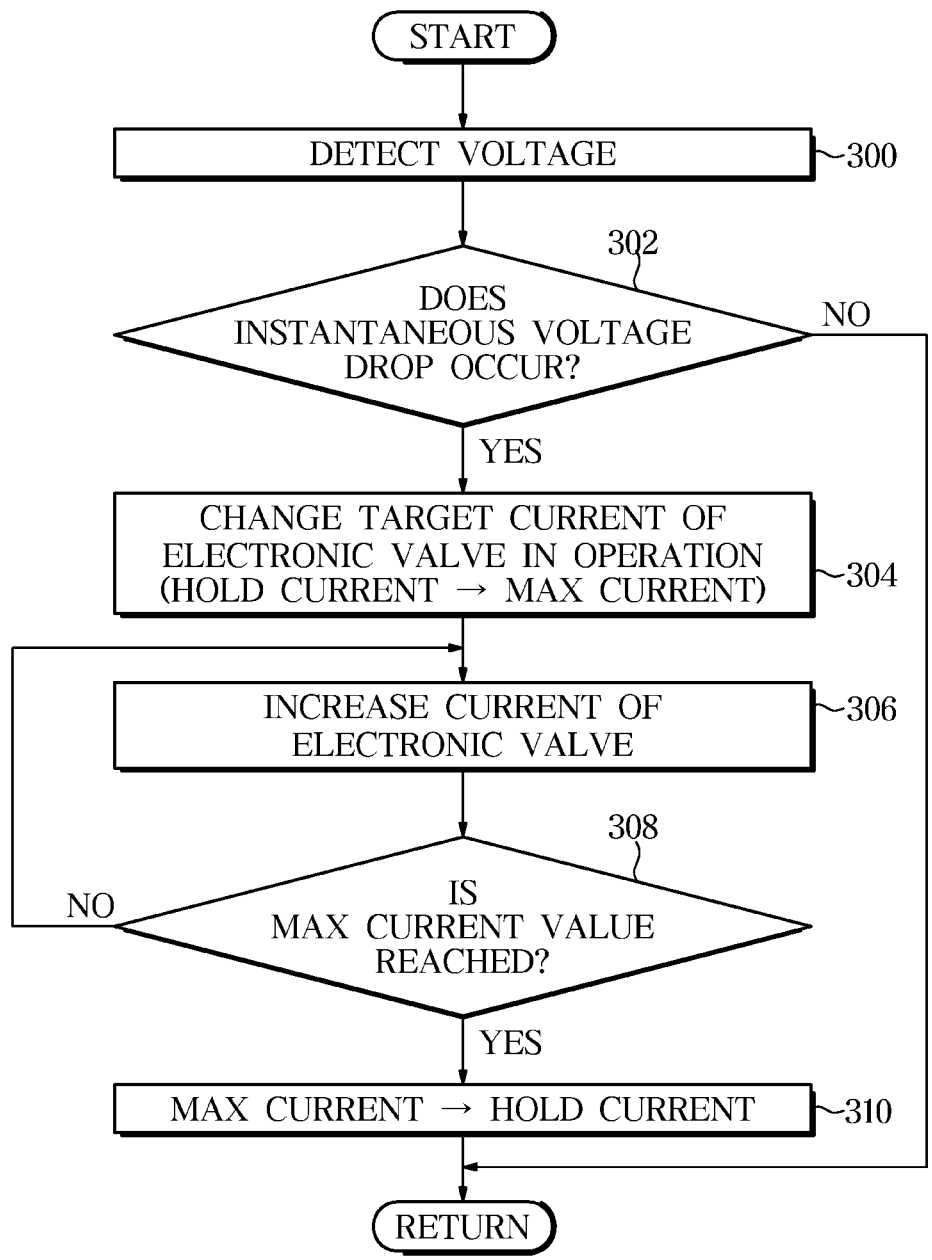
FIG. 6 is a flowchart illustrating a control method of an electronic brake system according to an embodiment.

FIG. 6 is a flowchart illustrating a control method of an electronic brake system according to an embodiment.

Referring to FIG. 6, the processor 110 detects a voltage input to the electronic brake system from a battery of a vehicle through the voltage sensor 12 (300). In this instance, instead of directly detecting the voltage through the voltage sensor 12, the processor 110 may receive information about the voltage from a system, that recognizes voltage information of the battery of the vehicle, among systems mounted on the vehicle through a vehicle network such as a controller area network (CAN) transceiver.

The processor 110 determines whether an instantaneous voltage drop occurs (or an instantaneous feedback current drop of an electronic valve in operation) occurs according to the voltage input to the electronic brake system from the battery during braking control of the electronic brake system (302). In this instance, when a change rate of voltage decreases by more than a preset voltage change rate, the processor 110 may determine that the instantaneous voltage drop occurs. Like the voltage, when a change rate of feedback current of the electronic valve in operation decreases by more than a preset current change rate, the processor 110 may determine that the instantaneous feedback current drop occurs.

As a result of operation 302, when it is determined that the instantaneous voltage drop (or instantaneous feedback current drop) occurs during braking control of the electronic brake system, the processor 110 may change a target current of the electronic valve in operation (304). The processor 110 may change the target current of the electronic valve that keeps operating, from a hold current to a max current. In this instance, even when the voltage input to the electronic brake system from the battery of the vehicle during braking control of the electronic brake system is lower than a preset voltage, the processor 110 may change the target current of the electronic valve in operation so that an operation of the electronic in operation valve is not affected by the voltage decrease.

After changing the target current value of the electronic valve in operation to a max current value which is higher than a hold current value, the processor 110 may increase a current of the electronic valve in operation so that a current value of the electronic valve in operation reaches the max current value (306).

The processor 110 may determine whether the current value of the electronic valve in operation reaches the max current value (308).

As a result of operation 308, when it is not determined that the current value of the electronic valve in operation reaches the max current value, the processor 110 may return to operation 306.

Meanwhile, when it is determined that the current value of the electronic valve in operation reaches the max current value as a result of operation 308, the processor 110 may maintain a state where the current value of the electronic valve in operation reaches the max current value for a preset period of time, and then decrease the current value of the electronic valve in operation from the max current value to the hold current value again (310). As such, when the instantaneous voltage drop occurs during braking control of the electronic brake system, the electronic valve in operation may be prevented from failing to maintain the hold current and being off. Accordingly, a desired flow path formation may be maintained, thereby may prevent a braking performance from being deteriorated and secure an operation stability of valve.

In the embodiment described above, it has been described that the electronic brake system is an integrated electronic brake system that generates a braking pressure by directly driving a pressure piston with a motor, but not limited thereto. The electronic brake system may be an active hydraulic booster (AHB) system including a brake actuation device where an ABS/ESC and a separate high-pressure device that generates a required pressure instated of an existing vacuum booster are integrated. Also, the electronic brake system may be various electronic brake systems that use an electronic valve such as ABS, TCS, ESC, or the like.

The invention claimed is:

1. An electronic brake system comprising a hydraulic circuit that supplies a hydraulic pressure to a wheel cylinder, the electronic brake system comprising:
   a plurality of electronic valves provided to open and close a flow path of the hydraulic circuit; and
   a controller configured to determine whether an instantaneous voltage drop occurs in a battery based on a voltage input from the battery of a vehicle during braking control, or whether an instantaneous feedback current drop occurs in an electronic valve in operation based on feedback currents of the plurality of electronic valves, and when the instantaneous voltage drop occurs in the battery or the instantaneous feedback current drop occurs in the electronic valve, correct a target current of the electronic valve in operation among the plurality of electronic valves, and increase a current supplied to the electronic valve so that the current of the electronic valve in operation reaches the corrected target current,
   wherein the controller is configured to correct the target current of the electronic valve in operation to a max current value higher than a hold current, when an instantaneous voltage drop occurs in the battery while maintaining the hold current.

2. The electronic brake system of claim 1, wherein the controller is configured to increase the target current of the electronic valve in operation to the max current that ensures a cut-in within a pressure range guaranteed by the electronic valve in operation.

3. The electronic brake system of claim 2, wherein the controller is configured to increase the current of the electronic valve in operation to the max current, and when the current of the electronic valve reaches the max current, maintain for a preset period of time, and then decrease the current of the electronic valve in operation to the hold current for maintaining an on state of the electronic valve in operation.

4. The electronic brake system of claim 1, wherein, when the voltage input from the battery is lower than a preset voltage or a feedback current of the electronic valve in operation is lower than a preset current, the controller is configured to increase the target current of the electronic valve in operation among the plurality of electronic valves.

5. The electronic brake system of claim 1, comprising:
   a voltage sensor configured to detect the voltage input from the battery.

6. The electronic brake system of claim 1, comprising:
   a current sensor configured to detect the feedback currents of the plurality of electronic valves.

7. A control method of an electronic brake system comprising a hydraulic circuit that supplies a hydraulic pressure to a wheel cylinder, the control method comprising:
   detecting a voltage input from a battery of a vehicle during braking control or feedback currents of a plurality of electronic valves provided to open and close a flow path of the hydraulic circuit;
   determining whether an instantaneous voltage drop occurs in a battery based on a voltage input from the battery of a vehicle during braking control, or whether an instantaneous feedback current drop occurs in an electronic valve in operation based on feedback currents of the plurality of electronic valves;
   when the instantaneous voltage drop occurs in the battery or the instantaneous feedback current drop occurs in the electronic valve, correcting a target current of the electronic valve in operation among the plurality of electronic valves; and
   increasing a current of the electronic valve in operation, so that the current of the electronic valve in operation reaches the corrected target current,
   wherein the target current of the electronic valve in operation is corrected to a max current value higher than a hold current, when an instantaneous voltage drop occurs in the battery while maintaining the hold current.

8. The control method of claim 7, wherein the correcting of the target current includes increasing the target current of the electronic valve in operation among the plurality of electronic valves, when the voltage input from the battery is lower than a preset voltage or a feedback current of the electronic valve in operation is lower than a preset current.

9. The control method of claim 8, wherein the increasing of the current of the electronic valve in operation includes increasing the target current of the electronic valve in operation to the max current that ensures a cut-in within a pressure range guaranteed by the electronic valve in operation.

10. The control method of claim 9, wherein, when the current of the electronic valve in operation reaches the max current, the current of the electronic valve in operation is maintained for a preset period of time, and then is decreased to the hold current for maintaining an on state of the electronic valve in operation.

\* \* \* \* \*